United States Patent [19]
Dickson et al.

[11] Patent Number: 5,191,416
[45] Date of Patent: Mar. 2, 1993

[54] VIDEO SIGNAL PROCESSING SYSTEM

[75] Inventors: Stewart P. Dickson, Thousand Oaks; William M. Villarreal, Los Angeles, both of Calif.

[73] Assignees: The Post Group Inc.; Pacific Title & Art Studio, both of Los Angeles, Calif.

[21] Appl. No.: 637,486

[22] Filed: Jan. 4, 1991

[51] Int. Cl.$^5$ .................... H04N 7/01; H04N 7/18; H04N 11/20

[52] U.S. Cl. .................... 358/140; 358/11; 358/105

[58] Field of Search .................... 358/140, 11, 105

[56] References Cited

U.S. PATENT DOCUMENTS

| | | | |
|---|---|---|---|
| 3,617,626 | 11/1971 | Bluth et al. | 358/311 |
| 3,716,670 | 2/1973 | Lowry | 358/340 |
| 3,751,584 | 8/1973 | Pickering et al. | 358/244.1 |
| 3,752,906 | 8/1973 | Lowry | 358/332 |
| 3,752,916 | 8/1973 | Lowry et al. | 358/160 |
| 3,778,543 | 12/1973 | Lowry | 358/37 |
| 3,804,980 | 4/1974 | Lowry | 358/162 |
| 4,112,459 | 9/1978 | Gautier et al. | 358/332 |
| 4,337,484 | 6/1982 | Broussard et al. | 358/244 |
| 4,484,188 | 11/1984 | Ott | 340/728 |
| 4,488,174 | 12/1984 | Mitchell et al. | 358/136 |
| 4,568,965 | 2/1986 | Powers | 358/11 |
| 4,577,225 | 3/1986 | Pritchard | 358/140 |
| 4,633,293 | 12/1986 | Powers | 358/11 |
| 4,663,665 | 5/1987 | Tanaka et al. | 358/140 |
| 4,673,978 | 6/1987 | Dischert et al. | 358/140 |
| 4,677,483 | 6/1987 | Dischert et al. | 358/140 |
| 4,843,380 | 6/1989 | Oakley et al. | 340/723 |
| 4,853,794 | 8/1989 | Tukumoto et al. | 358/447 |
| 5,025,495 | 6/1991 | Avis | 358/140 |
| 5,046,164 | 9/1991 | Hurst, Jr. | 358/140 |

OTHER PUBLICATIONS

Thorpe, Lawrence J. and Ozaki, Yoshio, "HDTV Electron Beam Recording," SMPTE Journal, pp. 833-843, Oct. 1988.

Comandini, Pete, "Signal Processing in the Image Transform System," SMPTE Journal, vol. 86, pp. 547-549, Aug. 1977.

Comandini, Pete and Roth, Toni, "Film Recording in the Image Transform System," SMPTE Journal, vol. 87, pp. 82-84, Feb. 1987.

Thomas, G. A., "Television Motion Measurement For Datv and other Applications," BBC Research Department Report, vol. 11, pp. 1-20, Sep. 1987.

Primary Examiner—John K. Peng
Attorney, Agent, or Firm—Pretty, Schroeder, Brueggemann & Clark

[57] ABSTRACT

An improved image processing system, for converting a conventional low-resolution video signal to a format suitable for transfer to high-resolution film, all while preserving the realistic effects of any motion represented in the original video signal. The system not only reduces the signal's frame rate to a rate compatible with that of the film to be produced, but also eliminates temporal aliasing that arises when the original interlaced video signal undergoes interlacing and frame-rate reduction.

34 Claims, 9 Drawing Sheets

X = ORIGINAL PIXEL
+ = INTERLACE PIXEL (HORIZONAL)
O = INTERLACE PIXEL (VERTICAL)

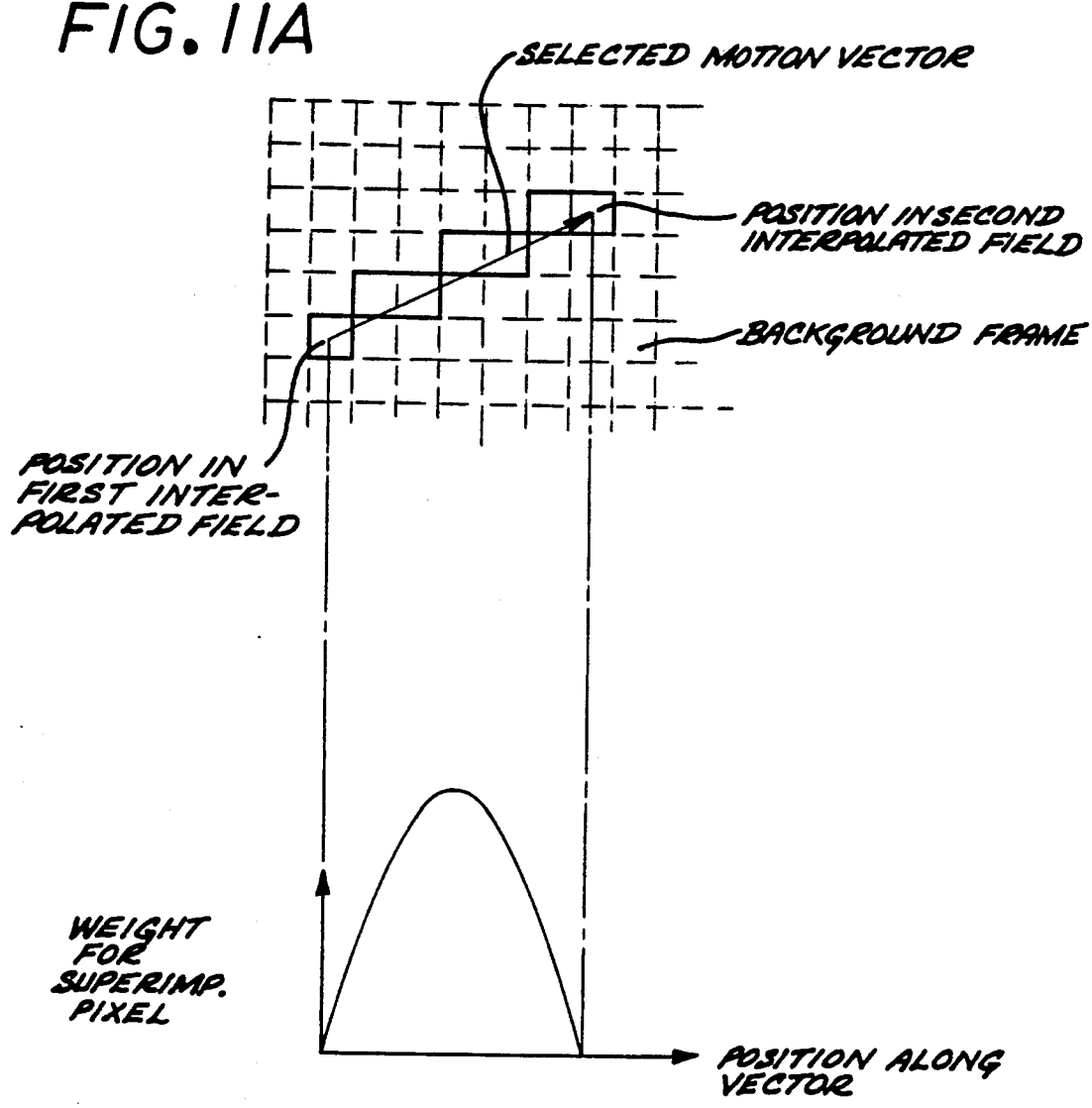

VIDEO SIGNAL PROCESSING SYSTEM

BACKGROUND OF THE INVENTION

This invention relates generally to video signal processing systems and, more particularly, to such systems that are useful in the conversion of a conventional low-resolution video signal to a format suitable for subsequent transfer to high-resolution film.

Video processing equipment is now commonly used in the editing of video signals prior to their being transferred to motion picture film. Because such equipment operates on electronic representations of the video image, it provides far superior flexibility in the kinds of image processing that can be readily accomplished. Converting the image information to a digital format facilitates a convenient computer processing of the information to accomplish color enhancement, image mixing, special imaging effects processing, and various other known image manipulations. In addition, instantaneous visual feedback to the operator of the effects of the image processing enables the operator to make iterative processing changes and thereby provide the desired results quickly and efficiently.

Heretofore, video signal processing has not proven to be entirely satisfactory for use in situations where the final image product is intended to be high-resolution (e.g., 35 mm) film. This is because most video processing equipment operates on relatively low-resolution image data derived from NTSC-formatted video signals and the like. In the NTSC format, for example, only 525 lines of vertical resolution are provided. This is generally considered insufficient when transferred to film. Theater-quality film, for example, typically would require at least about 1000 to 2000 lines of vertical and horizontal resolution for a presentation picture of acceptable quality.

Efforts have been made in the past to increase the vertical and horizontal resolution of low-resolution video images; however, such efforts have not proven to be entirely successful. These resolution enhancement techniques generally involve interpolating lines for interleaving with the existing low-resolution lines and by interpolating pixels for interleaving with the original pixels of each line. The resulting high-resolution images are not always realistic replications of the original images. Frequently, objectionable artifacts arise, particularly when the image's time base is being modified, for example, from 60 fields per second to 24 frames per second. So-called aliasing problems can cause moving objects to acquire undesired jagged vertical edges.

It should therefore be appreciated that there is a need for a video image processing system that effectively converts video signals from a low-resolution format to a high-resolution format, for subsequent transfer to high-resolution film, without introducing artifacts or otherwise detracting from the image quality. Such a processing system ideally is adapted to reduce the image's frame rate and to convert the image from an interlaced to a non-interlaced video format, all while accurately preserving motion effects represented in the original video signal. The present invention fulfills these needs.

SUMMARY OF THE INVENTION

The present invention is embodied in an image processing apparatus, and related method, for converting a conventional low-resolution video signal to a format suitable for transfer to high-resolution film, while preserving the realistic effects of any motion represented in the original video signal. In one feature of the invention, the apparatus reduces the signal's frame rate to a rate compatible with that of the film, while in another feature of the invention, the apparatus converts the signal from an interleaved field format to a non-interleaved frame format, all while preventing the introduction of objectionable artifacts to the image due to aliasing.

More particularly, the image processing apparatus of the invention includes background means for generating a succession of non-interlaced background frames, each based on two or more successive associated fields of the interlaced input video signal, and motion detection means for detecting areas of motion in the successive associated fields that correspond to each background frame and for generating data indicating the direction and magnitude of motion for each such detected area of motion. Superposition means also are included for incorporating the detected areas of motion into each background frame, to produce a succession of non-interlaced frames that constitute an output video signal that faithfully preserves the effect of any motion represented in the input video signal.

The background means for generating the succession of non-interlaced background frames includes interpolation means for interpolating the lines of the successive input video signal fields, to produce for each field an interpolated field that includes the original field lines interleaved with interpolated lines. Comparison means also are included for comparing the corresponding pixels of the interpolated fields for each background frame and selecting one of those compared pixels to be the corresponding pixel of the background frame being generated.

For example, whenever the pixels being compared are determined to differ from each other by less than a predetermined amount, the background frame pixel can be selected to be an original, non-interpolated pixel from the interpolated fields being compared. This maintains sharpness that is normally lost, to at least a limited extent, in the interpolated image. On the other hand, whenever the pixels being compared are determined to differ from each other by more than the predetermined amount, the background frame line can be selected according to some other predetermined criteria, e.g., by averaging the same pixel from the non-interpolated line of one interpolated field with the two pixels from the adjacent non-interpolated lines of the other interpolated field. The interpolation advantageously can be accomplished using a cubic spline interpolation algorithm. In processing input video signals that represent color, the apparatus advantageously can operate on each of three separate color signals simultaneously.

In another, independent feature of the invention, the motion detection means can include tile means for dividing each frame (e.g., interpolated field) of the input video signal into unique tiles of limited area and comparator means for comparing those portions of the input video signal representing corresponding tiles of the successive frames corresponding to each background frame and for generating a motion vector for each tile, indicating the direction and magnitude of any detected motion. For each tile for which the comparator means has detected motion, the superposition means superimposes the pixels of the tile on the corresponding background frame. This superposition is made along motion lines indicated by the generated motion vectors.

The comparator means preferably includes phase correlation means for computing the Fourier transform of the input video signal for each tile and for comparing the transforms of corresponding tiles for the successive frames corresponding to each background frame, to generate a phase correlation surface for each tile. Peaks in the phase correlation surface indicate a correlation between the video signals for the tiles, with the coordinates of such peaks characterizing a motion vector for that tile.

Further, the comparator means operates to determine the appropriate motion vector for each pixel of each tile in which motion is detected. This is accomplished by comparing each pixel and a predetermined number of surrounding pixels with corresponding pixels of a corresponding frame of the input video signal. Such corresponding pixels are selected in accordance with the motion vectors generated for that tile and for a predetermined number of its surrounding tiles. The particular motion vector that provides the best correlation is selected as being applicable to that pixel. The superposition means then superimposes that pixel on the background frame, the superposition being made along a line whose direction and length are determined by the selected motion vector. This superposition preferably is accomplished by summing together weighted amounts of the pixel and the background frame, with the weighted amount of the pixel diminishing substantially to zero at the vector's two ends.

The apparatus further includes resolution enhancement means, operable on the successive frames of the output video signal, after the pixels have been superimposed on the successive background frames, for increasing the horizontal and vertical resolution of each frame. In particular, this is accomplished by horizontally interpolating each line and by interpolating the original lines to generate additional lines for interleaving with the original lines. Both the horizontal and vertical interpolation preferably is accomplished by a cubic spline interpolation algorithm.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 11(a) is a schematic diagram showing the superposition of a pixel on a background frame, the superposition occurring along a line defined by the selected motion vector, and FIG. 11(b) shows the variation in weighting of the superimposed pixel as a function of position along the motion line.

DESCRIPTION OF THE PREFERRED EMBODIMENT

Figure 1:
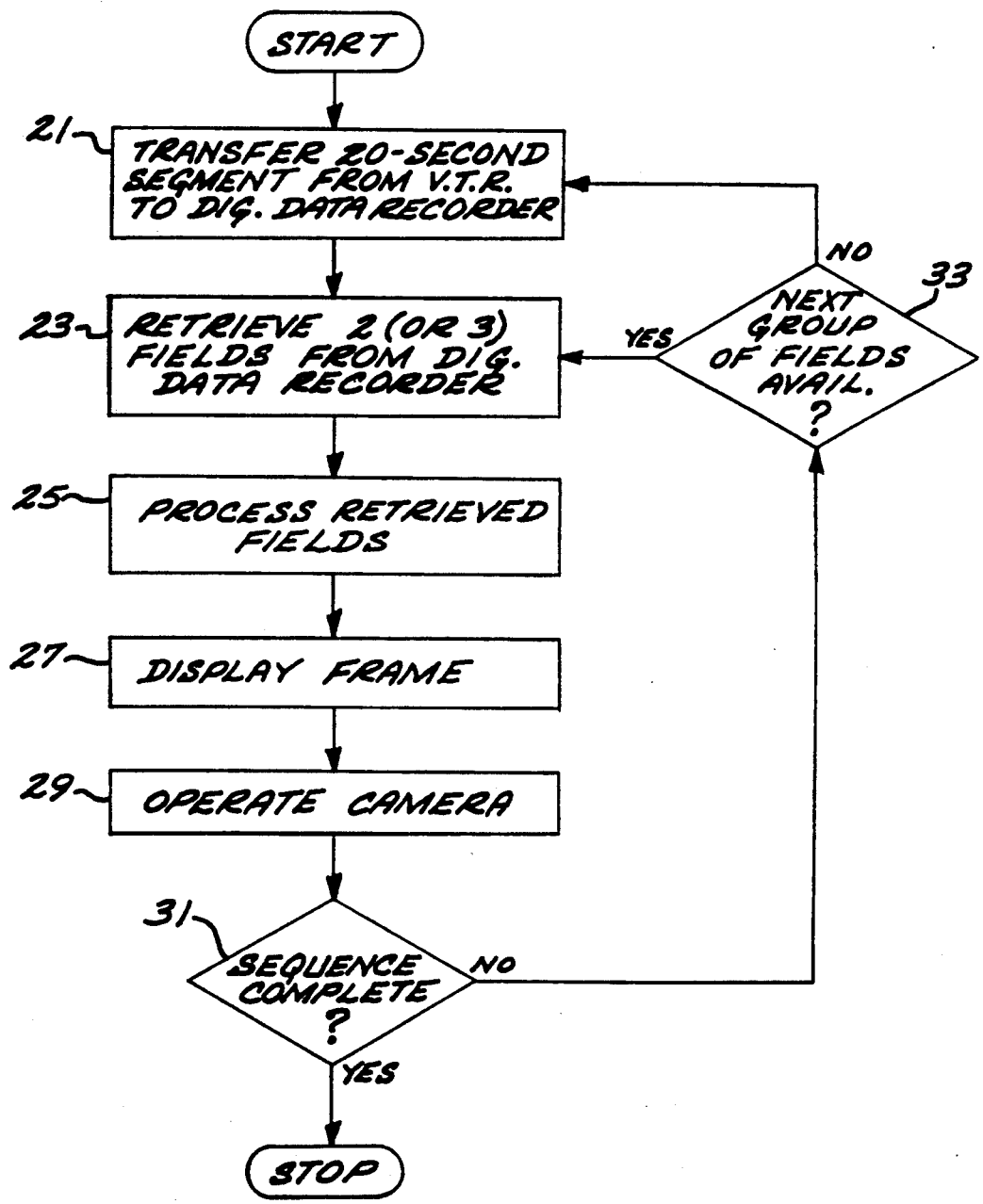
FIG. 1 is a generalized flowchart of steps performed by the apparatus of the invention, for converting a conventional low-resolution video signal to a high-resolution video signal and for transferring that high-resolution signal to high-resolution photographic film.

With reference now to the drawings, and particularly to FIG. 1, there is shown a generalized flowchart of steps performed by a video-to-film transfer system that converts low-resolution color video signals to a high-resolution format and that then transfers that high-resolution signal to photographic film. The system enables the convenient use of readily available video processing and editing equipment (not shown) to process the low-resolution video signal, after which the processed video signal is transferred to high-resolution film suitable for display, for example, in movie theaters. The system thereby obviates the need for an expensive and time consuming task of processing the images while in a film format.

The color video signal to be processed by the system is initially stored in a tape recorder, in any suitable low-resolution format, such as NTSC, PAL, etc. In an initial step 21 of the process, image data representing a brief segment of the video signal is transferred from the tape recorder to a digital data recorder. For example, a 20-second signal segment of an NTSC-format signal can be transferred and stored in digital form in the data recorder, representing 600 successive video frames, or 1200 interlaced fields. In transferring the video signal segment, the signal is transformed into three constituent color-signals, representing red, green and blue, and then digitized. The system operates to convert this stored digital data to corresponding data representing high-resolution frames occurring at, for example, a rate of 24 frames per second.

For video signals that have their origin in film at this same 24 frame per second rate, each such final film frame will correspond to either two or three fields of the 60 field per second video signal. The same will be true if the video signal originated from a video camera that generated 30 frames, or 60 fields, per second. In either case, digital data representing alternately two or three successive fields are retrieved each time from the recorder, in step 23, and the retrieved fields are then appropriately combined and processed in step 25 to generate data representative of the desired 24 frame per second, high-resolution signal. This processing is repeated in step 25 for each of the red, green and blue color components of the original color video signal.

Thereafter, in step 27, the processed image data is displayed on a high-resolution display and, in step 29, a camera is operated to expose the displayed image in its film. Steps 27 and 29 are repeated for each of the three colors that make up each high-resolution color image.

After a single frame of high-resolution data has been transferred to the film, the system determines in step 31, whether or not the entire film transfer process has been completed. If so, the program is exited. If not, on the other hand, the program proceeds to step 33, where it is determined whether or not additional, unprocessed image data remains in the digital data recorder. If so, the program returns to the step 23 of retrieving two or three fields, as the case may be, from the recorder, for processing into the high-resolution image data, as described previously. On the other hand, if no unprocessed data remains in the digital data recorder, the program returns to the initial step 21 of transferring to the recorder a 20-second segment of the low-resolution color video signal.

Figure 2:
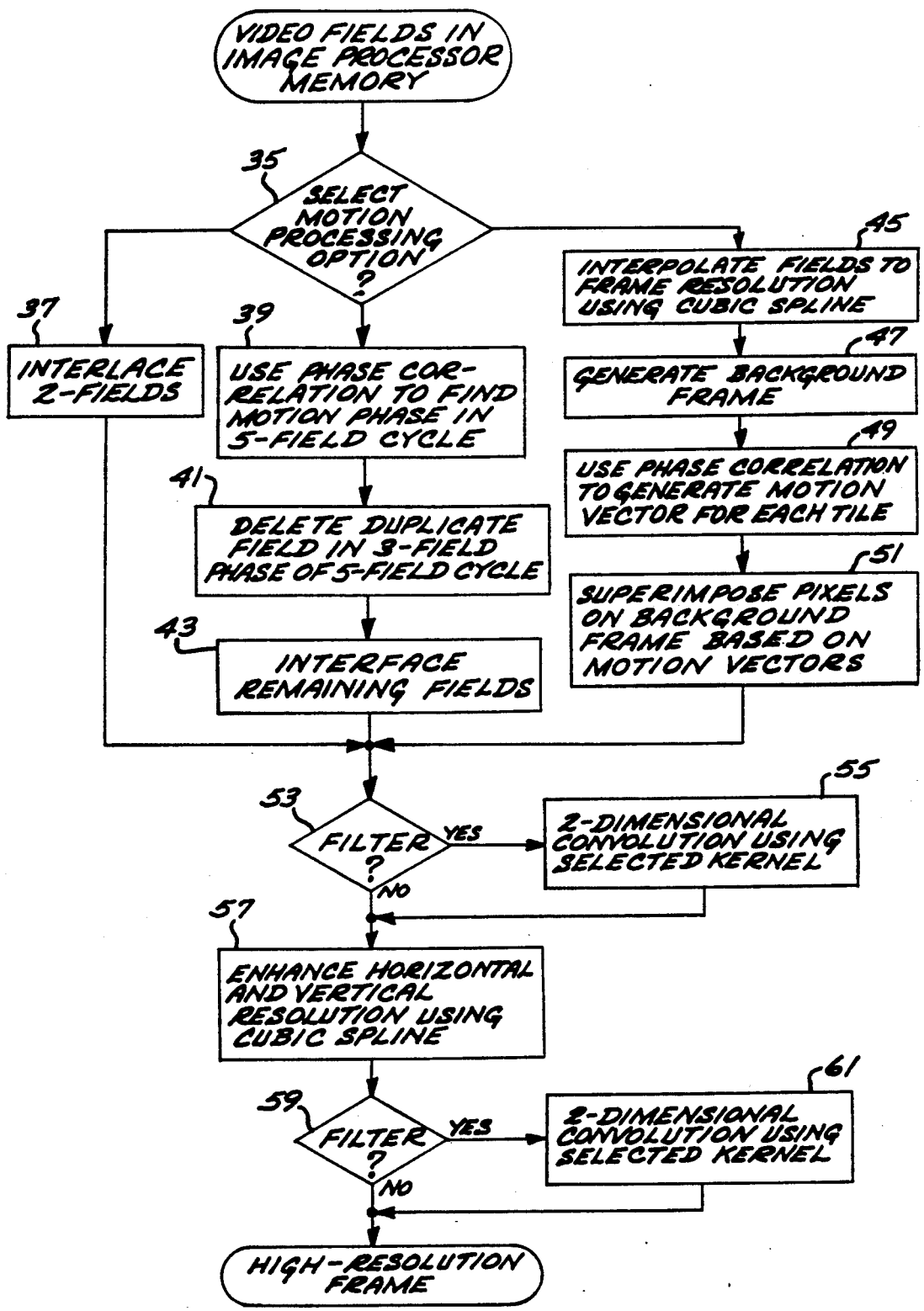
FIG. 2 is a more detailed flowchart showing the operational steps performed by the block entitled Process Fields, in FIG. 1, for converting the low-resolution video signal to a corresponding high-resolution signal.

FIG. 2 is a more detailed flowchart of the steps performed in carrying out the data processing step 25 in the flowchart of FIG. 1. In this step, two or three fields of image data are processed and combined to generate a single frame of high-resolution image data. In an initial step 35 of this more detailed flowchart, it is determined what the original source was of the low-resolution image data. Depending on the outcome of that determination, one of three separate legs of the flowchart will be followed. If the image data originated in film, at a rate of 24 frames per second, and was then converted to low-resolution video data at a rate of 48 interleaved fields per second, then the left leg at the top of the flowchart of FIG. 2 is followed. On the other hand, if the image data originated in film, at a rate of 24 frames per second, and was then converted to low-resolution video signal at a rate of 60 interleaved fields per second, then the middle leg of the flowchart is followed. Finally, if the low-resolution image data originated in a video camera operating at 60 interleaved fields per second, then the right leg of the flowchart is followed. For each leg, what results is a succession of low-resolution, non-interlaced frames corresponding to the original image data, but now at a 24 frame per second rate.

In the left leg of the flowchart of FIG. 2, which is followed when it is determined at step 35 that the low-resolution image data originated in film, at 24 frames per second, and was subsequently converted to an interlaced video signal, at 48 fields per second, just a single step 37 is required. In that step, the two fields derived from each original frame are merely interlaced with each other to form a video-resolution, non-interlaced frame sized at 720×486 pixels.

In the middle leg of the flowchart of FIG. 2, which is followed when it has been determined at step 35 that the video-resolution image data originated in film, at 24 frames per second, but was subsequently converted to an interlaced video signal, at 60 fields per second, several steps are required. First, in step 39, the successive fields are correlated with each other to determine whether or not they are based on the same original film frame. In this format, there will be alternately two and three successive fields corresponding to each original film frame. Any suitable correlation technique can be utilized in carrying out this step, although the phase correlation technique described below is preferred. Thereafter, in step 41, every fifth field is discarded, to leave remaining two fields for each of the original film frames. Finally, in step 43, the two fields derived from each original film frame are interlaced with each other to form a succession of low-resolution, non-interlaced frames.

In the right leg of the flowchart of FIG. 2, which is followed when it has been determined at step 35 that the incoming image data originated in a video camera operating at 60 fields per second, the image data undergoes substantial processing both to reduce it to image data at 24 frames per second and also to reduce the undesired effects of temporal aliasing. Such anti-aliasing is required in this case because each successive field of the original 60-field per second image data represents a separate snapshot of the image being represented. If that image is continuously changing, each field will be unique and a simple interlacing of successive fields will yield objectionable motion artifacts.

More particularly, the right leg of the flowchart of FIG. 2 includes an initial step 45 of interpolating each successive field to a frame resolution. This requires the generation of additional lines for interlacing with the original lines so as to double the total number of lines. No interpolation is required horizontally on any of the lines. Thereafter, in step 47, alternately two or three of these successive interpolated fields are appropriately combined with each other to produce a single background frame that will form the background for the single non-aliased frame being generated. Then, in step 49, a phase correlation algorithm is utilized to detect motion in individual tiles, sized for example at 64×64 pixels, in the two or three interpolated fields currently under consideration. In this step 49, a motion vector representing the direction and magnitude of detected motion for each tile in the frame is generated.

Thereafter, in step 51, each pixel of each tile having a non-zero motion vector is superimposed on the background frame. This superposition occurs along a motion line selected in accordance with the motion vectors for either that tile or one of that tile's neighboring tiles. What results is a single low-resolution, non-interlaced frame representing the original 60-field per second image data, but now at 24 frames per second and now with temporal aliasing removed. The steps 45, 47, 49, and 51 of this right leg of the flowchart of FIG. 2 will be described in greater detail below with reference to FIG. 4.

As previously described, after completing one of the three legs of the flowchart of FIG. 2, a low-resolution, non-interlaced frame is provided. The steps set forth in the remainder of the flowchart of FIG. 2 appropriately process each such frame to increase its resolution to a pixel array sized at about 1000×1000 pixels. Thus, in step 53, it is determined whether or not the image data is to be processed by a pre-enlargement filter. If so, the low-resolution image undergoes a two-dimensional convolution, in step 55, using an empirically-determined kernel. Typically, the kernel can be selected so as to provide any desired degree of edge softening or edge enhancement.

Figure 3:
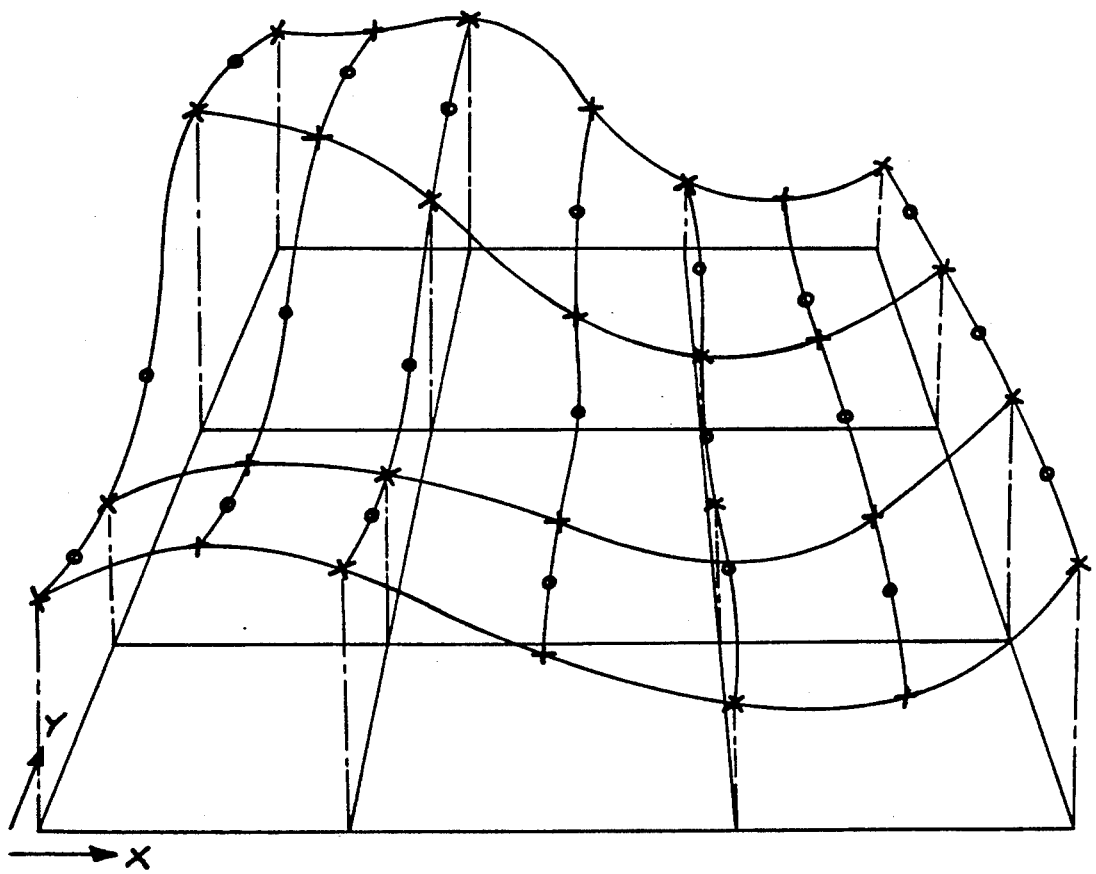
FIG. 3 is a schematic representation of a cubic spline interpolation algorithm utilized in the resolution enhancement step set forth in the flowchart of FIG. 2.

If it is determined in step 53 that no pre-enlargement filter has been selected, or following application of that pre-enlargement filter in step 55, the program proceeds to step 57, in which the low-resolution video signal is enlarged to a high-resolution format using a cubic spline interpolation algorithm. In particular, and with reference to FIG. 3, additional pixels are generated for each horizontal line in the frame by interpolating between the original pixels. The value of each interpolated pixel is determined by defining a third-order intensity function based on the four nearest original pixels in the line. The value of that third-order, i.e., cubic, function at the site of the pixel being interpolated determines that pixel's proper intensity. What results is an intermediate-resolution low-resolution signal, but having approximately double the number of pixels in each such line.

A similar procedure is followed in step 57 when interpolating additional lines, to increase the signal's vertical resolution. For each pixel in each interpolated line, the vertically-aligned pixels from the four nearest original lines are utilized to define a third order, i.e., cubic, intensity function. The value of that function at the site of the pixel being interpolated determines that pixel's intensity. Thus, what results is a horizontally-and vertically-enhanced video signal having about 1000 horizontal lines and about 1000 pixels in each line. It will be appreciated that the interpolated pixels alternatively could be generated first by interpolating vertically, generating additional lines, and then by interpolating horizontally, generating additional pixels in each line.

It also will be appreciated that the high-resolution data produced in step 57 could have any specific number of lines and pixels in each line and that the pixels that comprise the low-resolution data need not all be represented exactly in this high-resolution data. In fact, all that is actually necessary is that each pixel in the high-resolution data be based on a cubic spline interpolation of four original pixels or four previously-interpolated pixels.

Following step 57, in which the video data is enlarged from low-resolution to high-resolution, the program proceeds to step 59, in which it is determined whether or not a post-enlargement filter has been selected. If it has, then the high-resolution image data undergoes a two-dimensional convolution, in step 61, with a second empirically-determined kernel. As with the pre-enlargement kernel used in step 55, this post-enlargement kernel is selected to provide any degree of edge softening or edge enhancement. The resulting image data, or the unfiltered data if it is determined at step 59 that no such filtering is to be performed, represents the final high-resolution image to be displayed and transferred to film, in steps 27 and 29 (FIG. 1).

Figure 4:
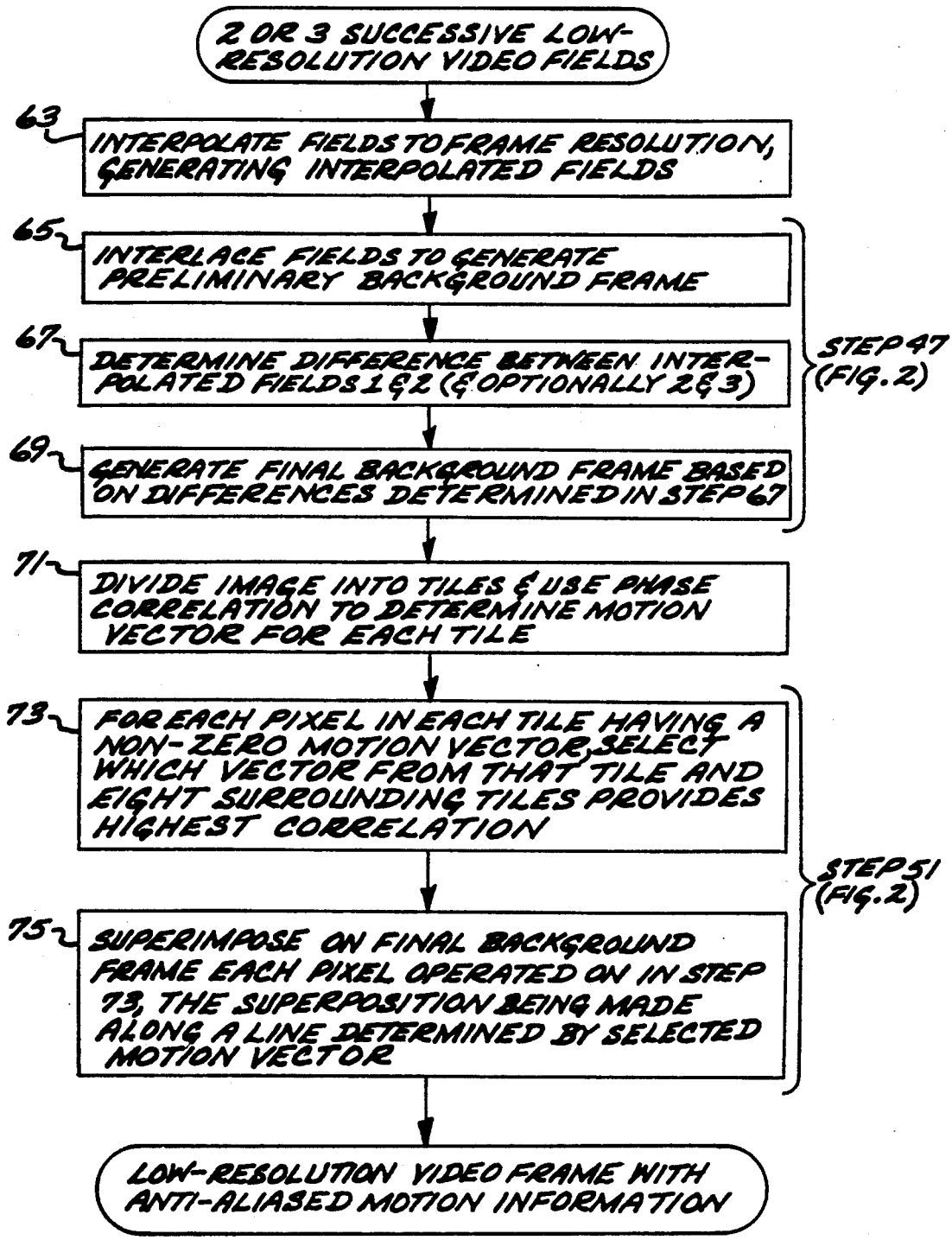
FIG. 4 is a detailed flowchart showing the operational steps performed in carrying out one leg of the flowchart of FIG. 2.

FIG. 4 depicts a detailed flowchart of the detailed steps performed in implementing the right leg of the flowchart of FIG. 2. It will be recalled that this leg is followed when the image data being processed is derived from a video camera operating at 60 interleaved fields per second. This leg of the FIG. 2 flowchart reduces the image data's rate to 24 frames per second and also reduces the undesired effects of temporal aliasing.

In an initial step 63, the image data representing two, or sometimes three, video fields is interpolated to frame resolution. In particular, the number of horizontal lines is effectively doubled using a cubic spline interpolation algorithm, as discussed above. No horizontal interpolation is performed at this time. This step corresponds to step 45 in the flowchart of FIG. 2.

In the following step 65, a preliminary background frame is generated by interlacing the two original fields, without regard to any of the interpolated lines generated in the step 63. This preliminary background frame will include motion artifacts if any portion of the image has moved from the time of the first field to the time of the second field.

Thereafter, in step 67, the two interpolated fields are compared with each other by subtracting one from the other. Thus, for each pixel in the entire frame, the difference between an original pixel from one field and an interpolated pixel from the other field will be generated. This is performed for each of the three colors. Then, in step 69, on a pixel-by-pixel basis, this difference information is used to controllably modify the preliminary background frame. In particular, if it is determined that an original pixel from one interpolated field has a color value that differs from that of the corresponding interpolated pixel from the other interpolated field by less than a predetermined amount, then that pixel in the preliminary background frame remains unchanged. This maintains sharpness normally lost, at least to a limited extent, in the interpolated image.

On the other hand, if it is determined that an original pixel from one interpolated field has a color value that differs from that of the corresponding interpolated pixel from the other interpolated field by more than the predetermined amount, then an average of adjacent interlaced pixels will be substituted for the preliminary background frame pixel. In essence, it is assumed that the average of the foreground and the background is likely to be less objectionable than are interlaced motion artifacts.

After all of the pixels in the preliminary background frame have been analyzed and substituted out, where indicated, a final background frame is provided. In cases where three interpolated frames are present, steps 67 and 69 are repeated for the second and third interpolated frames. Steps 65, 67 and 69 together correspond to step 47 in the flowchart of FIG. 2. These steps are all performed separately, and preferably simultaneously, for all three colors of the original video signal.

After the final background frame has been generated in step 69, the background frame's two-dimensional plane is divided into contiguous square tiles, in step 71, each tile including a 64×64 array of pixels. Operating on the two or three interpolated fields, a phase correlation procedure is followed to determine a motion vector for each such tile. Each such vector indicates the direction and magnitude of motion detected in a separate tile, from one interpolated field to the next. This phase correlation step 71 is discussed below in significantly greater detail, with reference to the flowchart of FIG. 5.

Figure 6A:
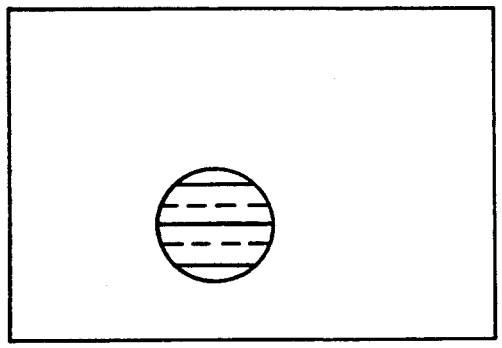
FIGS. 6(a) and (b) are schematic representations of two successive fields of the low-resolution video signal, after interpolation to include additional horizontal lines and showing movement of an object along a motion vector oriented to the right.
Figure 6B:
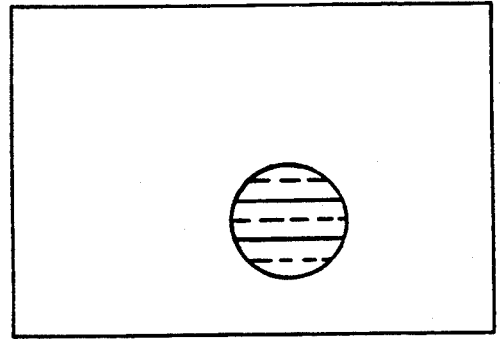
Figure 7:
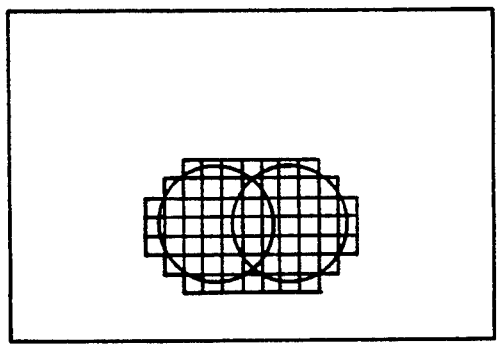
FIG. 7 is a schematic diagram of an arrangement of contiguous tiles overlapping those portions of the image of FIGS. 6(a) and (b) determined to include motion

FIGS. 6(a) and (b) are simplified drawings of two successive interpolated fields showing movement of a circular object from left to right. The remaining, undepicted portions of the two fields are unchanged and do not undergo any movement. Performing the phase correlation procedure of step 71 on these two interpolated fields will produce non-zero motion vectors for all of the tiles indicated in FIG. 7. The remaining, undepicted tiles will all have no motion vectors.

Figure 9:
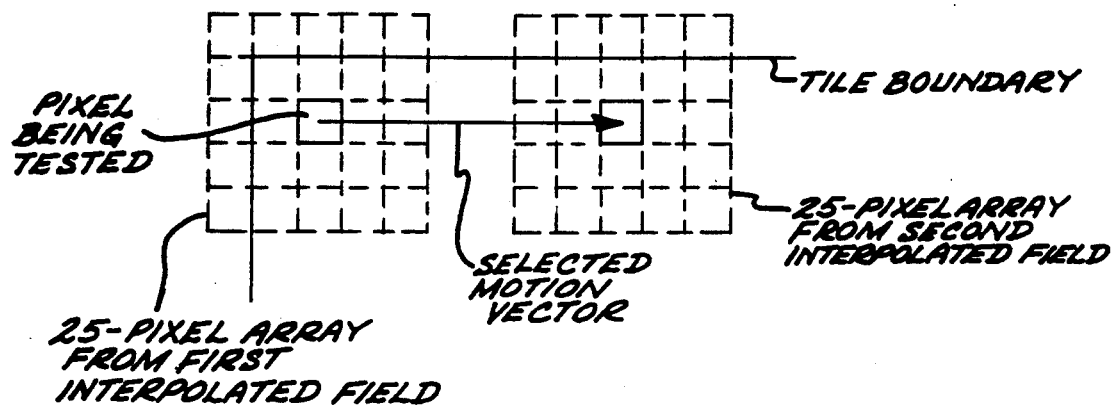
FIG. 9 is a schematic diagram showing a portion of the 64×64 array of pixels that comprise a particular tile, with 5×5 array of pixels surrounding a particular pixel of interest being identified for correlation with a set of 5×5 pixel arrays from the corresponding interpolated field determined in accordance with the motion vector generated for this particular tile and the motion vectors generated for the eight immediately surrounding tiles.

In a subsequent step 73, it is determined which tiles have non-zero motion vectors and it is further determined which particular motion vector is properly applicable to each pixel in each of those tiles. In particular, each pixel in the 64×64 array and its surrounding 24 pixels, comprising a 5×5 array, are compared with specific 5×5 arrays from the corresponding interpolated field that are selected in accordance with the motion vector for that pixel's particular tile, as well as the motion vectors for the eight immediately surrounding tiles. Thus, up to nine separate correlations are performed for each pixel in the 64×64 pixel tile. The particular one of the correlations that yields the highest value, i.e., that correlates the best, determines the motion vector that is most properly applicable to that pixel. One example of such a correlation is depicted in FIG. 9.

Step 73 is utilized because of the recognition that each pixel in a particular tile does not necessarily undergo motion that is indicated for that tile as a whole. On the contrary, that pixel might represent an extension of an object that is located predominantly in an adjacent tile and thus is undergoing motion that corresponds to the motion vector for that adjacent tile.

Figure 10:
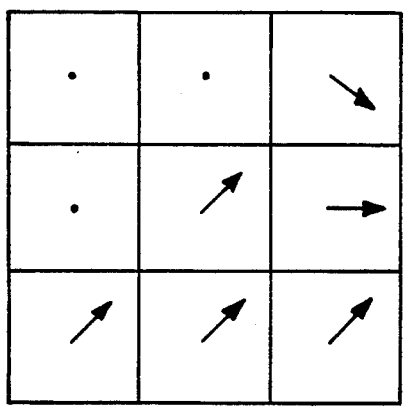
FIG. 10 is a schematic diagram showing the motion vectors detected for a particular tile and the eight tiles immediately surrounding it.

FIG. 10 depicts an example in which a particular tile having a non-zero motion vector is surrounded by eight tiles having a mix of motion vectors. Three of the tiles have no motion vectors, three have motion vectors the same as the tile in question, and the two remaining tiles have still different motion vectors.

In a subsequent step 75, each pixel of each tile for which a non-zero motion vector has been generated, is superimposed on the final background frame (generated in step 69) along a line defined by the motion vector selected in step 73 for that pixel. In this superposition, weighted values of the background frame pixels and the pixel being superimposed are summed together to generate the final data. This weighting preferably follows one-half cycle of sine wave, with the superimposed pixel having zero weight at the two ends of the motion vector and a maximum weight at the vector's midpoint, and conversely with the background pixels having maximum weight at the vector's two ends and zero weight at the vector's midpoint Steps 73 and 75 correspond to step 51 in the flowchart of FIG. 2.

FIGS. 11(a) and (b) depict one example of this pixel superposition. The pixels are superimposed on those pixels of the background frame that are crossed by the selected motion vector, as shown in FIG. 11(a). The relative weighting of the superimposed pixels is determined with reference to FIG. 11(b).

After step 75 has been performed for all of the pixels in each tile for which a non-zero motion vector has been generated, a single low-resolution, non-interlaced frame is provided, with anti-aliased motion This frame then undergoes pre-enlargement filtering, enlargement to high resolution, and post-enlargement filtering, as described above with reference to the flowchart of FIG. 2.

Figure 5:
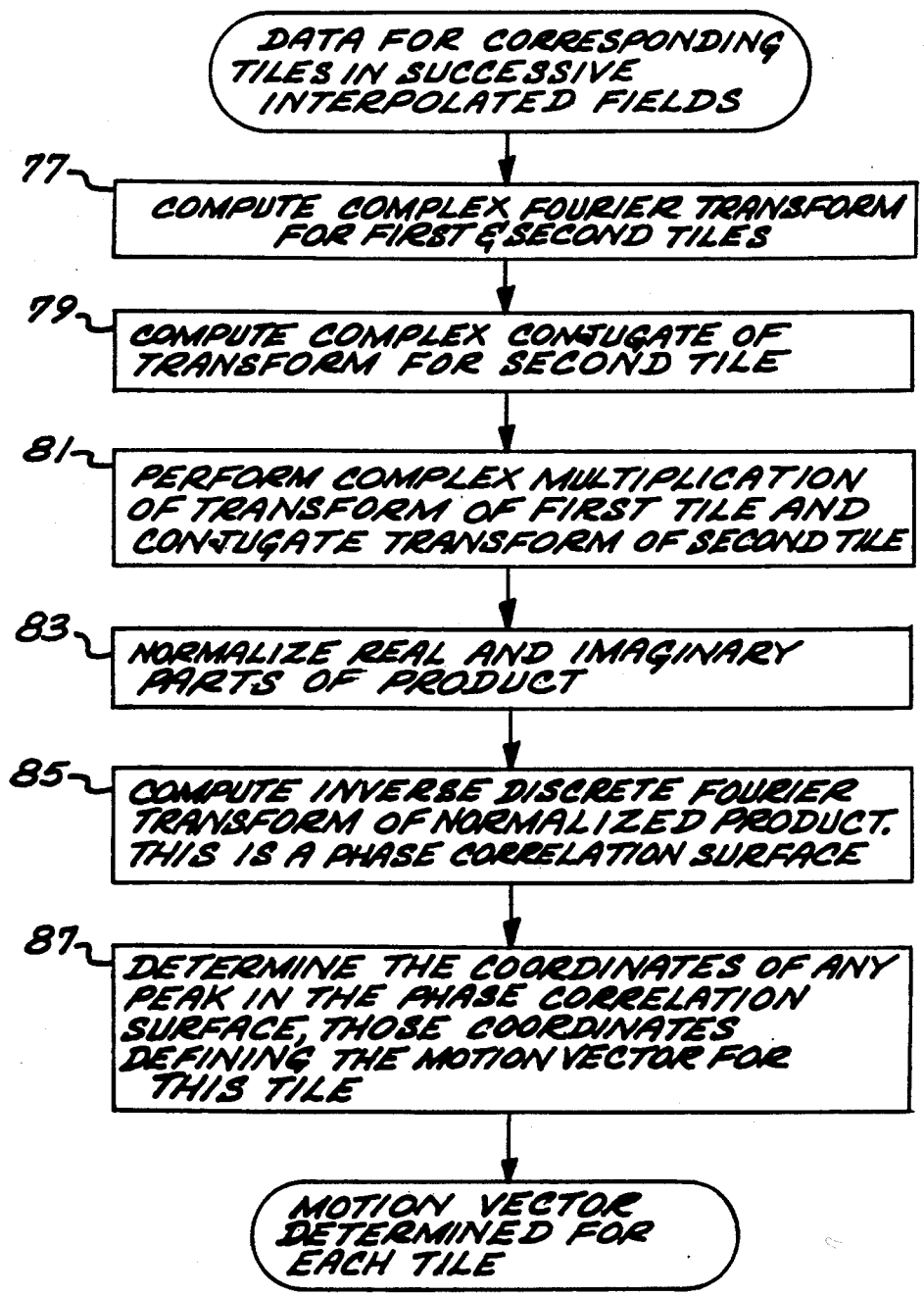
FIG. 5 is a detailed flowchart of the operational steps carried out in implementing the phase correlation step referred to in the flowchart of FIG. 4.

FIG. 5 is a detailed flowchart that expands upon the phase correlation step 71 in FIG. 4. In this step 71, a motion vector is determined for each tile in the pair of interpolated fields being processed. In an initial step 77 of this process, a discrete complex Fourier transform is computed for corresponding tiles in the two interpolated fields. The complex conjugate of the Fourier transform for the tile in the second interpolated fields is then computed in step 79. The transform for the tile in the first interpolated field and the conjugate transform for the tile in the second interpolated field then undergo a complex multiplication, in step 81. The resulting complex product is then normalized to unit magnitude in step 83, by dividing the real and imaginary parts of the product by the product's computed magnitude.

Figure 8:
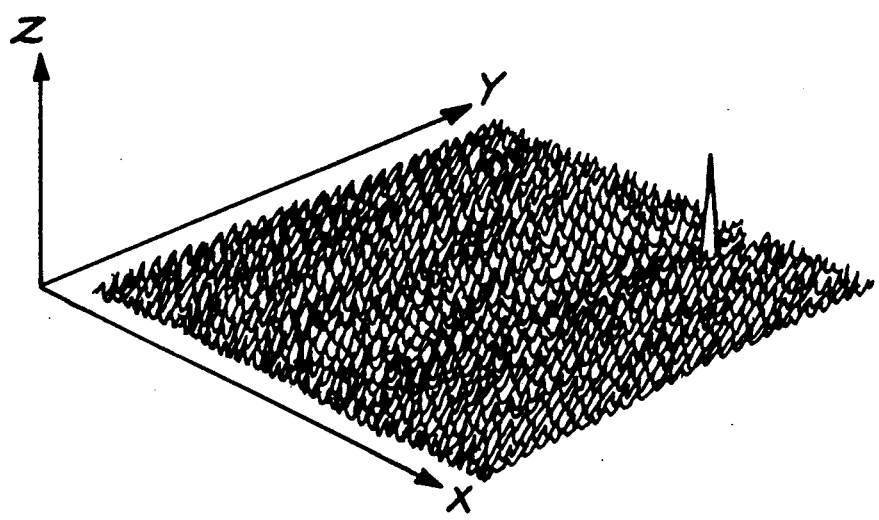
FIG. 8 is a graphical representation of a phase correlation surface generated by appropriately combining the Fourier transforms generated for corresponding tiles of successive interpolated fields in which motion has been detected, the coordinates of the peak in the phase correlation surface characterizing a motion vector that indicates the motion that objects within the tile undergo from one interpolated field to the next.

Step 85 of the process then computes the inverse discrete Fourier transform of the normalized product, to yield a correlation surface. An example of such a correlation surface is depicted in FIG. 8. A peak in this surface, which represents a correlation between specific portions of the tiles in the two interpolated fields being operated on, is detected in step 87. The x-y coordinates of such a peak indicate the direction and magnitude of any motion. Thus, a peak at the origin of the x-y coordinate system would indicate that no motion has been detected for the tile, whereas a peak located to the right of the origin, as in the example of FIG. 8, would indicate the presence of motion upwardly and to the right from the first interpolated field to the next.

These steps 77–87 can be repeated in cases where three interpolated fields are present. In those cases, a motion vector is determined for the second and third interpolated fields, thus yielding two successive motion vectors for each tile. The superposition of pixels then can be made along lines determined by two motion vectors rather than one.

In some cases, more than one significant peak in a tile's phase correlation surface will be detected. This would occur, for example, in situations where a portion of the tile is moving in one direction, while an object depicted in another portion of the tile is either stationary or moving in another direction. In these cases, more than one motion vector can be assigned to that tile, and the step 73 (FIG. 4) of selecting a motion vector for each pixel in the tile is expanded to include the additional vector or vectors.

It should be appreciated from the foregoing description that the present invention provides an improved image processing system, for converting a conventional low-resolution video signal to a format suitable for transfer to high-resolution film, all while preserving the realistic effects of any motion represented in the original video signal. The system not only reduces the signal's frame rate to a rate compatible with that of the film to be produced, but also eliminates temporal aliasing that arises when the original interlaced video signal undergoes interlacing and frame-rate reduction.

Although the invention has been described in detail with reference only to the presently-preferred embodiment, those of ordinary skill in the art will appreciate that various modifications can be made without departing from the invention. Accordingly, the invention is defined only by the following claims.

We claim:

1. An image processing apparatus for converting an input video signal having a succession of interlaced fields, each representing an image at a different time, to an output video signal having a succession of non-interlaced frames, the image processing apparatus comprising:

background means responsive to the interlaced input video signal for generating a succession of non-interlaced background frames, each based on two or more successive associated fields of the input video signal;

motion detection means for detecting areas of motion in the successive associated fields of the input video signal corresponding to each background frame and for generating data indicating the direction and magnitude of motion for each detected area of motion; and superposition means for incorporating the detected areas of motion into each background frame, to produce a succession of non-interlaced frames constituting an output video signal that preserves the effect of any motion represented in the input video signal.

2. An image processing apparatus as defined in claim 1, wherein the background means includes:

interpolation means for interpolating the lines of each of the successive fields in the input video signal, to produce for each field an interpolated field that includes the original field lines interleaved with interpolated lines; and comparison means for comparing the corresponding pixels of the interpolated fields produced for the successive associated fields corresponding to each background frame and for selecting each pixel of the background frame based on the corresponding pixels of the interpolated fields.

3. An image processing apparatus as defined in claim 2, wherein the comparison means is configured such that in generating each pixel of each background frame, the comparison means compares the corresponding pixels of the successive associated interpolated fields and, whenever the pixels are determined to differ from each other by less than a predetermined amount, selects the background frame pixel to be an original, non-interpolated pixel, and, whenever the pixels are determined to differ from each other by more than the predetermined amount, selects the background frame pixel according to a predetermined rule.

4. An image processing apparatus as defined in claim 3, wherein the comparison means is configured such that, whenever the corresponding pixels of the successive associated interpolated fields are determined to differ from each other by more than the predetermined amount, the comparison means selects the background frame pixel based on an average of the compared pixel that is non-interpolated and adjacent non-interpolated pixels.

5. An image processing apparatus as defined in claim 2, wherein the interpolation means utilized a cubic spline interpolation algorithm.

6. An image processing apparatus as defined in claim 1, wherein:

the input video signal includes separate signals representing each of three separate colors; and the background means, motion detection means, and superposition means all operate separately on the signals representing the three separate colors.

7. An image processing apparatus for converting an input video signal having a first frame rate to an output video signal having a second, lower frame rate, while substantially preserving the effect of any motion represented in the input video signal, the image processing apparatus comprising:

background means for generating a succession of background frames, each based on two or more successive frames derived from an input video signal;

motion detection means for detecting areas of motion in the successive frames of the input video signal corresponding to each background frame and for generating data indicating the direction and magnitude of motion for each detected area of motion; and superposition means for incorporating the detected areas of motion into each background frame, to produce a succession of frames constituting an output video signal, the output video signal having a lower frame rate than the input video signal, while substantially preserving the effect of any motion represented in the input video signal.

8. An image processing apparatus as defined in claim 7, wherein:

the motion detection means includes tile means for dividing each frame of the input video signal into unique tiles of limited area, and comparator means for comparing the portions of the input video signal representing corresponding tiles of the successive frames of the input video signal corresponding to each background frame and for generating a motion vector for each tile, indicating the direction and magnitude of any detected motion; and for each tile for which the comparator means has detected motion, the superposition means superimposes the pixels of the tile on the corresponding background frame along motion lines indicated by the generated motion vectors.

9. An image processing apparatus as defined in claim 8, wherein the comparator means includes phase correlation means for computing the Fourier transform of the input video signal for each tile of each frame and for comparing the transforms of corresponding tiles for the successive frames corresponding to each background frame, to generate a phase correlation surface for each tile, wherein the coordinates of any peak in the surface characterize a motion vector for that tile.

10. An image processing apparatus as defined in claim 8, wherein:

the tiles defined by the tile means are rectangular and contiguous with each other;

for each pixel of each tile for which the comparator means has detected motion, the comparator means compares the pixel and a predetermined number of surrounding pixels with corresponding pixels of a corresponding frame of the input video signal, such corresponding pixels being selected in accordance with the motion vectors generated for that tile and a predetermined number of its surrounding tiles, to determine and select the particular motion vector that provides the best correlation; and the superposition means superimposes on the background frame each pixel of each tile for which the comparator means has detected motion, the superposition being made along a line whose direction and length are selected in accordance with the motion vector selected by the comparator means for that particular pixel.

11. An image processing apparatus as defined in claim 10, wherein:

the tiles defined by the tile means each include 4096 pixels arranged in an $64 \times 64$ pattern; and the comparator means operates on each pixel and the surrounding pixels within two rows and two columns of that pixel when determining the particular motion vector that provides the best correlation.

12. An image processing apparatus as defined in claim 10, wherein for each pixel of each tile for which the comparator means has detected motion, the superposition means sums together weighted amounts of the pixel and the background frame, along the selected motion vector, the weighted amount of the pixel diminishing substantially to zero at the two ends of the vector.

13. An image processing apparatus as defined in claim 8, wherein for each pixel of each tile for which the comparator means has detected motion, the superposition means sums together weighted amounts of the pixel and the background frame along the selected motion vector, the weighted amount of the pixel diminishing substantially to zero at the two ends of the vector.

14. An image processing apparatus as defined in claim 7, wherein:
the input video signal includes separate signals representing each of three separate colors; and
the background means, motion detection means, and superposition means all operate separately on the signals representing the three separate colors.

15. An image processing apparatus as defined in claim 7, and further including resolution enhancement means operable on the successive frames of the output video signal to increase the horizontal resolution of each frame, by horizontally interpolating each line, and to increase the vertical resolution of each frame, by interpolating the original lines to generate additional lines interleaved with the original lines.

16. An image processing apparatus as defined in claim 15, wherein the resolution enhancement means increases the horizontal and vertical resolution of each frame of the output video signal using a cubic spline interpolation algorithm.

17. An image processing apparatus as defined in claim 7, wherein:
the input video signal includes a succession of interlaced fields; and
the background means includes interpolation means for interpolating the lines of the successive fields of the input video signal, to produce for each field an interpolated field that includes the original field lines interleaved with interpolated lines, the interpolated fields then being utilized by the background means to generate the succession of background frames.

18. An image processing method for converting an input video signal having a succession of interlaced fields, each representing an image at a different time, to an output video signal having a succession of non-interlaced frames, the image processing method comprising steps of:
generating a succession of non-interlaced background frames, each based on two or more successive associated fields of the interlaced input video signal;
detecting areas of motion in the successive associated fields of the input video signal corresponding to each background frame and generating data indicating the direction and magnitude of motion for each detected area of motion; and
incorporating the detected areas of motion into each background frame, to produce a succession of non-interlaced frames constituting an output video signal that preserves the effect of any motion represented in the input video signal.

19. An image processing method as defined in claim 18, wherein the step of generating includes steps of:
interpolating the lines of each of the successive fields in the input video signal, to produce for each field an interpolated field that includes the original field lines interleaved with interpolated lines; and
comparing the corresponding pixels of the interpolated fields produced for the successive associated fields corresponding to each background frame and for selecting each pixel of the background frame based on the corresponding pixels of the interpolated fields.

20. An image processing method as defined in claim 19, wherein the step of comparing, in generating each pixel of each background frame, compares the corresponding pixels of the successive associated interpolated fields and, whenever the pixels are determined to differ from each other by less than a predetermined amount, selects the background frame pixel to be an original, non-interpolated pixel, and, whenever the pixels are determined to differ from each other by more than the predetermined amount, selects the background frame pixel according to a predetermined rule.

21. An image processing method as defined in claim 20, wherein whenever the corresponding pixels of the successive associated interpolated fields are determined in the step of comparing to differ from each other by more than the predetermined amount, the step of comparing selects the background frame pixel based on an average of the compared pixel that is non-interpolated and adjacent non-interpolated pixels.

22. An image processing method as defined in claim 19, wherein the step of interpolating utilizes a cubic spline interpolation algorithm.

23. An image processing method as defined in claim 18, wherein:
the input video signal includes separate signals representing each of three separate colors; and
the steps of generating, detecting and incorporating are all performed separately on the signals representing the three separate colors.

24. An image processing method for converting an input video signal having a first frame rate to an output video signal having a second, lower frame rate, while substantially preserving the effect of any motion represented in the input video signal, the image processing method comprising steps of:
generating a succession of background frames, each based on two or more successive frames derived from an input video signal;
detecting areas of motion in the successive frames of the input video signal corresponding to each background frame and for generating data indicating the direction and magnitude of motion for each detected area of motion; and
incorporating the detected areas of motion into each background frame, to produce a succession of frames constituting an output video signal, the output video signal having a lower frame rate than the input video signal, while substantially preserving the effect of any motion represented in the input video signal.

25. An image processing method as defined in claim 24, wherein:
the step of detecting includes steps of
dividing each frame of the input video signal into unique tiles of limited area, and
comparing the portions of the input video signal representing corresponding tiles of the successive frames of the input video signal corresponding to each background frame and generating a motion vector for each tile, indicating the direction and magnitude of any detected motion; and
for each tile for which the step of comparing has detected motion, the step of incorporating superimposes the pixels of the tile on the corresponding background frame along motion lines indicated by the generated motion vectors.

26. An image processing method as defined in claim 25, wherein the step of comparing includes a step of computing the Fourier transform of the input video signal for each tile of each frame and comparing the transforms of corresponding tiles for the successive frames corresponding to each background frame, to generate a phase correlation surface for each tile, wherein the coordinates of any peak in the surface characterize a motion vector for that tile.

27. An image processing method as defined in claim 25, wherein:
the tiles defined in the step of dividing are rectangular and contiguous with each other;
for each pixel of each tile for which the step of comparing has detected motion, the step of comparing compares the pixel and a predetermined number of surrounding pixels with corresponding pixels of a corresponding frame of the input video signal, such corresponding pixels being selected in accordance with the motion vectors generated for that tile and a predetermined number of its surrounding tiles, to determine and select the particular motion vector that provides the best correlation; and
the step of incorporating includes a step of superimposing on the background frame each pixel of each tile for which the step of comparing has detected motion, the superposition being made along a line whose direction and length are selected in accordance with the motion vector selected in the step of comparing for that particular pixel.

28. An image processing method as defined in claim 27, wherein:
the tiles defined in the step of dividing each include 4096 pixels arranged in an 64×64 pattern; and
the step of comparing operates on each pixel and the surrounding pixels within two rows and two columns of that pixel when determining the particular motion vector that provides the best correlation.

29. An image processing method as defined in claim 27, wherein for each pixel of each tile for which the step of comparing has detected motion, the step of superimposing sums together weighted amounts of the pixel and the background frame, along the selected motion vector, the weighted amount of the pixel diminishing substantially to zero at the two ends of the vector.

30. An image processing method as defined in claim 25, wherein for each pixel of each tile for which the step of comparing has detected motion, the step of incorporating sums together weighted amounts of the pixel and the background frame along the selected motion vector, the weighted amount of the pixel diminishing substantially to zero at the two ends of the vector.

31. An image processing method as defined in claim 24, wherein:
the input video signal includes separate signals representing each of three separate colors; and
the steps of generating, detecting, and incorporating are all performed separately on the signals representing the three separate colors.

32. An image processing method as defined in claim 24, and further including a step of enhancing resolution by operating on the successive frames of the output video signal to increase the horizontal resolution of each frame, by horizontally interpolating each line, and to increase the vertical resolution of each frame, by interpolating the original lines to generate additional lines interleaved with the original lines.

33. An image processing method as defined in claim 32, wherein the step of enhancing resolution increases the horizontal and vertical resolution of each frame of the output video signal using a cubic spline interpolation algorithm.

34. An image processing method as defined in claim 24, wherein:
the input video signal includes a succession of interlaced fields; and
the step of generating includes a step of interpolating the lines of the successive fields of the input video signal, to produce for each field an interpolated field that includes the original field lines interleaved with interpolated lines, the interpolated fields then being utilized in the step of generating to generate the succession of background frames.

* * * * *